United States Patent
Hatano (10) Patent No.: US 7,496,139 B2
(45) Date of Patent: Feb. 24, 2009

(54) BIT REDUCTION APPARATUS

(75) Inventor: Takahisa Hatano, Hokkaido (JP)

(73) Assignee: Panasonic Corporation, Osaka (JP)

( * ) Notice: Subject to any disclaimer, the term of this patent is extended or adjusted under 35 U.S.C. 154(b) by 994 days.

(21) Appl. No.: 10/503,103

(22) PCT Filed: Aug. 8, 2003

(86) PCT No.: PCT/JP03/10155

§ 371 (c)(1),
(2), (4) Date: Jul. 28, 2004

(87) PCT Pub. No.: WO2004/019606

PCT Pub. Date: Mar. 4, 2004

(65) Prior Publication Data

US 2005/0083434 A1 Apr. 21, 2005

(30) Foreign Application Priority Data

Aug. 20, 2002 (JP) .............................. 2002-239131

(51) Int. Cl.
*H04N 7/12* (2006.01)
*H04N 11/02* (2006.01)
(52) U.S. Cl. ................. 375/240.01; 348/384.1
(58) Field of Classification Search ............. 348/384.1, 348/405.1, 419.1, 425.1, 27, 533, 597, 606, 348/607, 613, 618, 621, 622, 623, 627, 631, 348/416.1; 382/232, 199, 251, 254, 260, 382/261, 262, 263, 264, 266, 268, 275; 375/240.03, 375/240.26, 240.29, 240.01
See application file for complete search history.

(56) References Cited

U.S. PATENT DOCUMENTS

| | | | | |
|---|---|---|---|---|
| 4,875,095 A | * | 10/1989 | Matsumoto et al. | .... 375/240.12 |
| 5,347,621 A | * | 9/1994 | Yutaka | ........................ 345/593 |
| 6,381,373 B1 | * | 4/2002 | Suzuki et al. | ................ 382/263 |
| 6,718,121 B1 | * | 4/2004 | Shikunami | .................. 386/109 |
| 6,990,246 B1 | * | 1/2006 | Ferguson | .................... 382/240 |

FOREIGN PATENT DOCUMENTS

JP 2000-224047 8/2000
JP 2003-219323 7/2003

OTHER PUBLICATIONS

International Search Report corresponding to application No. PCT/JP03/10155 dated Oct. 22, 2003.

* cited by examiner

*Primary Examiner*—Behrooz Senfi
(74) *Attorney, Agent, or Firm*—RatnerPrestia (57) ABSTRACT

A bit reduction apparatus prevents visual recognition of beat noise while maintaining gradation. The bit reduction apparatus changes over the bit reduction operation by executing simple discarding process and noise shaping process, on the basis of at least any one of input signal state, user's setting state, and apparatus setting state.

8 Claims, 5 Drawing Sheets

BIT REDUCTION APPARATUS

This application is a U.S. National Phase Application of PCT International Application PCT/3P03/10155.

TECHNICAL FIELD

The present invention relates to a bit reduction apparatus for curtailing the number of bits while maintaining the gradation of video signal.

BACKGROUND ART

In digital signal processing, generally, the greater the number of bits to be digitized, the higher becomes the gradation. However, as the number of bits increases, the circuit scale and the number of pins of device are increased. Various methods have been proposed so far for curtailing the number of bits while maintaining the gradation in digital signal processing, an example of which is disclosed in Japanese Laid-open Patent No. 2000-224047.

As a more general circuit, a bit number curtailing circuit using adder and delay unit for noise shaping is used widely. This prior art is explained in FIG. 5, FIG. 6, and FIG. 7 as a conventional example.

Figure 5:
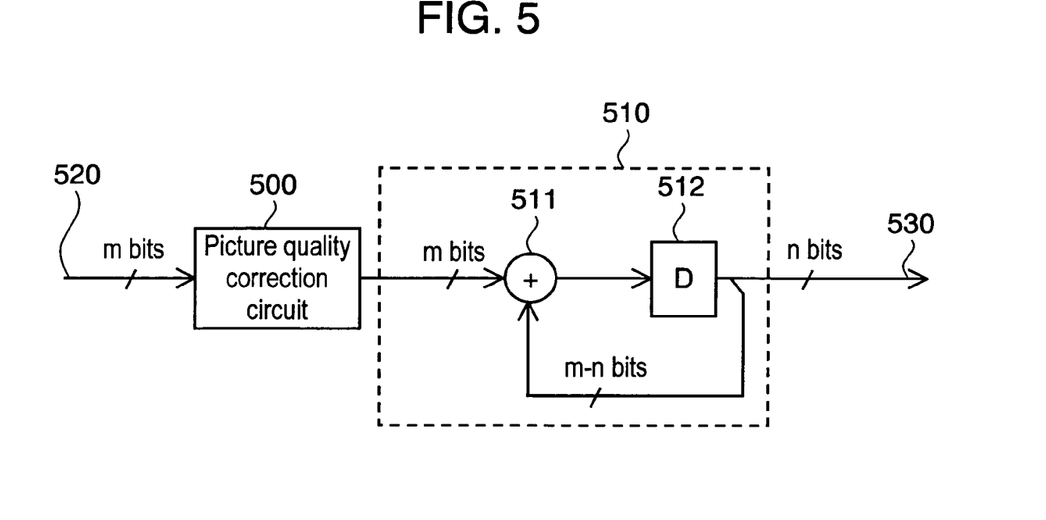
FIG. 5 is a block diagram showing an example of conventional bit reduction apparatus.

FIG. 5 is a block diagram showing a structure of the conventional example. In the diagram, a picture quality correction circuit 500 applies various digital signal processings on m bits (m being an integer) of input signal supplied through an input terminal 520. At this time, bits are processed depending on the signal processing content so that the bit precision of the input signal composed of m bits may not be spoiled. Consequently, a noise shaping circuit 510 composed of an adder 511 and a delay unit 512 curtails the number of bits, and converts the signal composed of m bits into a signal composed of n bits (n being an integer and smaller than m).

Figure 6:
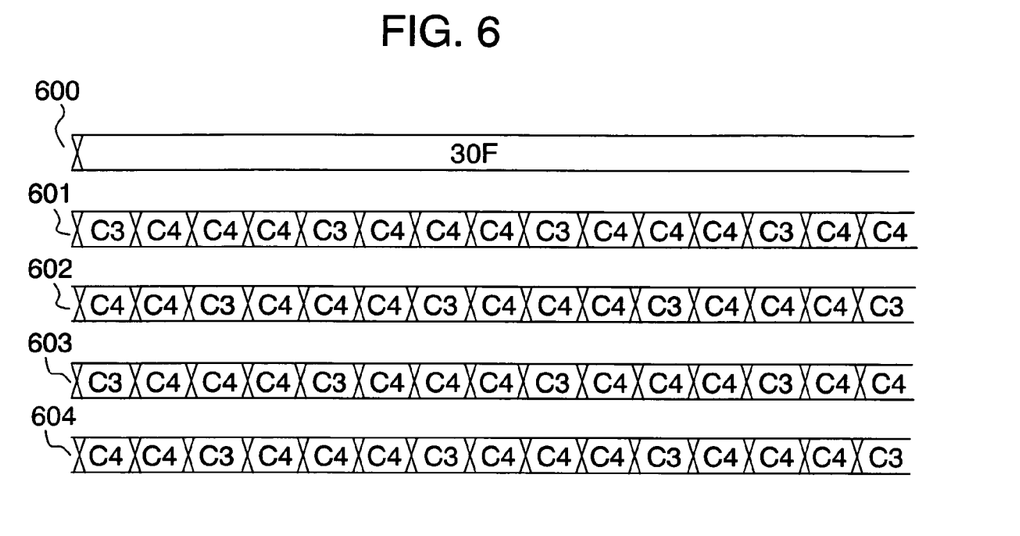
FIG. 6 is a timing chart showing operation of the bit reduction apparatus.

FIG. 6 shows this mode. In FIG. 6, m in FIG. 5 is 10, and n is 8. Value 600 shows the output of the picture quality correction circuit 500, and the output of the picture quality correction circuit 500 is assumed to be 30F in hexadecimal notation. That is, 30F in hexadecimal notation is 783 in decimal notation.

When converted to 8 bits, it is 195.75, and by discarding simply, it is 195. As a result, the portion below the decimal point, that is, the portion of two lower bits of 10 bits is ignored. The noise shaping circuit 510 modulates the portion of two lost bits by PWM (pulse width modulation), and adds to the higher bits, so that the information of the lower bits can be reproduced artificially by the integrating effect.

The adder 511 adds the two lower bits of the output of the delay unit 512 and the output of the picture quality correction circuit 500 of m bits, and supplies the sum into the delay unit 512. By the output of eight higher bits excluding two lower bits of the output of the delay unit 512, PWM processing of lower bits is realized. Herein, since the adder 512 generally overflows, a limiter is provided in a rear stage.

Value 601 shows the timing chart of value after conversion of the number of bits to eight bits by the noise shaping circuit 510. Value 602 is a timing chart of value in a scanning period next to 601, 603 in a scanning period next to 602, and 604 in a scanning period next to 603. In ten bits, the signal of 30F is converted into C3, C4, C4, C4, C3, C4, C4, C4, . . . C3 is 195 in decimal notation, and C4 is 196. Integrating C3, C4, C4, C4, the result is 195.75, and it is known that the precision of ten bits is reproduced artificially.

Figure 7:
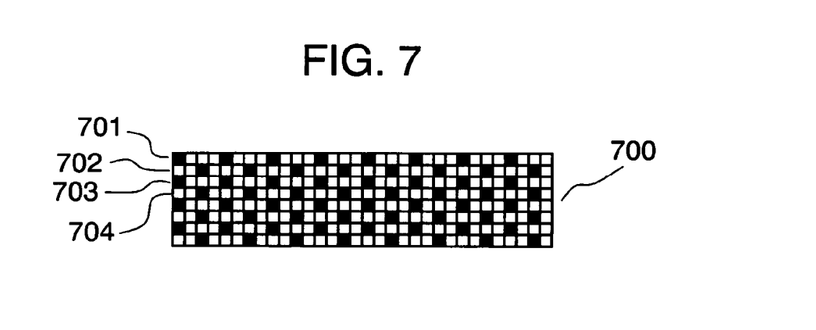
FIG. 7 is a diagram showing mode of image displayed on a screen by using the conventional bit reduction apparatus.

FIG. 7 shows a mode of image displayed on the screen after the processing above. In FIG. 7, scanning line 702 is a scanning line next to scanning line 701, scanning line 703 is a scanning line next to scanning line 702, and scanning line 704 is a scanning line next to scanning line 703. Value 601 is value displayed in scanning line 701, 602 in scanning line 702, 603 in scanning line 703, and 604 in scanning line 704. Solid cell indicates pixel of C3 and blank cell indicates pixel of C4. Therefore, pixels slightly different in luminance coexist. The coexistent pattern does not change so much, and may be sometimes close to stationary state.

In this process, when the input signal is steady luminance, in particular, in the case of liquid crystal panel of large size and low resolution, for example, in a 20 V type with resolution VGA of 640×480 dots, that is, one pixel is large in size, the PWM component may be visually recognized as beat noise or vertical line noise.

Generally, a video signal changes every moment, and the PWM component is not so obvious. On the other hand, when the input signal is no input, it is a signal of 0 in terms of DC. That is, 0 in terms of DC means black, and usually it is not obvious if there is noise, but in the event of offset of video signal by the picture quality correction circuit 500 (corresponding to user's adjustment for raising the black level), PWM component can be visually recognized as noise.

DISCLOSURE OF THE INVENTION

A bit reduction apparatus comprises:
 a picture quality correction circuit for correcting picture quality of input video signal,
 a first bit reduction unit for curtailing the number of bits of output of the picture quality correction circuit,
 a second bit reduction unit for curtailing the number of bits of output of the picture quality correction circuit,
 a discriminating circuit for generating a discrimination signal at least as one of the factors for judging the detection result of synchronizing signal of input video signal, and
 a first selector controlled by the discriminating circuit for selecting either one of the output of the first bit reduction unit and the output of the second bit reduction unit,
 in which the first bit reduction unit includes a first noise shaping circuit for shaping the noise of the output of the picture quality correction circuit and curtailing the number of bits.

DETAILED DESCRIPTION OF THE PREFERRED EMBODIMENT

The bit reduction apparatus of the invention changes over the bit reduction operation at least on the basis of the input signal state, the user setting state, or the apparatus setting state. By this operation, the bit reduction apparatus of the invention can prevent generation of beat noise while maintaining the gradation, and also can solve the problems of the prior art.

Exemplary Embodiments

Figure 1:
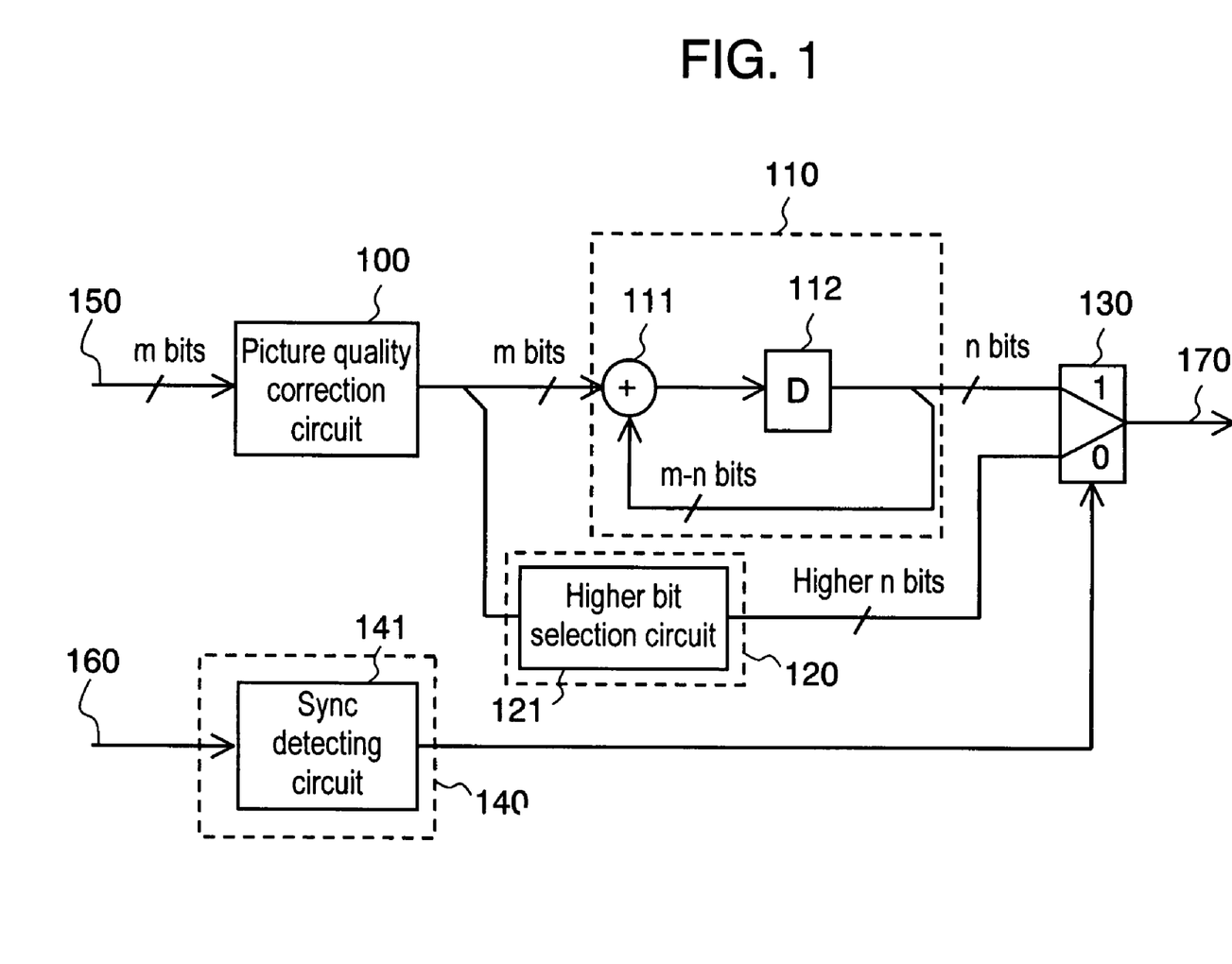
FIG. 1 is a block diagram of bit reduction apparatus of the invention.

FIG. 1 is a block diagram of bit reduction apparatus of the invention. In FIG. 1, a picture quality correction circuit 100 corrects the picture quality of input video signal supplied through a terminal 150. The output of the picture quality correction circuit 100 is supplied into a first noise shaping circuit 110 as first bit reduction unit (hereinafter called noise shaping circuit 110) and a second bit reduction unit 120. In FIG. 1, the first bit reduction unit is the noise shaping circuit 110 composed of an adder 111 and a delay unit 112, and the second bit reduction unit 120 includes a first higher bit selection circuit 121 (hereinafter called higher bit selection circuit 121). The adder 111 adds the specified lower bits of output of the delay unit 112 and the output of the picture quality correction circuit 100. The delay unit 112 delays the output of the adder 111. A first selector 130 (hereinafter called selector 130) receives specified higher bits of output of the delay unit 112 as first input, and output of the higher bit selection circuit 121 as second input, and selects either one. A discriminating circuit 140 judges presence or absence of synchronizing signal of the video signal entered through a terminal 160, and controls the selector 130 on the basis of the result of detection. In FIG. 1, the discriminating circuit 140 is composed of a sync detecting circuit 121.

A specific operation is described below. The picture quality correction circuit 100 executes various digital signal processings on an input signal composed of, m bits (m being an integer). At this time, the bit processing is carried out depending on the signal processing content so as not to spoil the bit precision of input signal of m bits. For example, in the case of black level adjustment of input signal, by adding a specific value to the input video signal, the black level is adjusted. The output of the picture quality correction signal 100 is supposed to maintain the same bit precision of m bits as the input signal.

The output of the selector 130 is supplied into a rear stage by way of a terminal 170. Such rear stage is, for example, a liquid crystal panel, and supposing the number of bits to be handle is n bits (n being an integer and smaller than m), the number of bits must be curtailed somewhere. Accordingly, the number of bits is curtailed by the noise shaping circuit 110 composed of adder 111 and delay unit 112 and the higher bit selection circuit 121. That is, the signal composed of m bits is converted into a signal composed of n bits. The first bit reduction unit 110 is composed of noise shaping circuit, and hence noise shaping is executed at the same time. This noise shaping is explained by referring to FIG. 1 and FIG. 6.

As assumed in the example in FIG. 1 and FIG. 6, m is 10, n is 8, and the output of the picture quality correction circuit 100 is 30F in hexadecimal notation. The output of the picture quality correction circuit 100 is indicated by value 600, which is 30F in hexadecimal notation, or 783 in decimal notation. When converted into eight bits, it is 197.75. Values 601, 602, 603, and 604 in FIG. 6 show timing charts of values after the number of bits is converted into eight bits by the noise shaping circuit 110 composed of the adder 111 and delay unit 112. Same as in the prior art explained in FIG. 5, in ten bits, the signal of 30F is converted into C3, C4, C4, C4, C3, C4, C4, C4, .... That is, the output of the noise shaping circuit 110 is accompanied by PWM explained above.

C3 is 195 in decimal notation, and C4 is 196. Integrating C3, C4, C4, C4, the result is 195.75, and it is known that the precision of ten bits is reproduced artificially.

Actually, the input signal is not fixed at 30F, but varies depending on the image content from time to time. Besides, the input signal in the picture quality correction circuit 100 includes quantization errors during analog-digital conversion and others, and the input signal is always changing.

On the other hand, when the input signal is no input, it is perfectly equal to input of "0" signal digitally. At this time, supposing the picture quality correction circuit 100 produces 30F by black level adjustment, the output of the picture quality correction circuit 100 is always fixed at 30F, and the signal after noise shaping regularly repeats C3 and C4, and in this case it is obvious as noise.

The sync detecting circuit 141 for composing the discriminating circuit 140 detects whether no input or not by detecting presence or absence of sync signal. In the case of no input, the discriminating circuit 140 controls the selector 130 so that the selector 130 can select the output of the second bit reduction unit 120. The second bit reduction unit 120 is composed of the higher bit selection circuit 121 for selecting only the higher bits of the output of the picture quality correction circuit 100. That is, the selector 130 issues a signal not undergoing noise shaping. By such constitution, noise in no signal time and gradation in ordinary operation can be both established.

Figure 2:
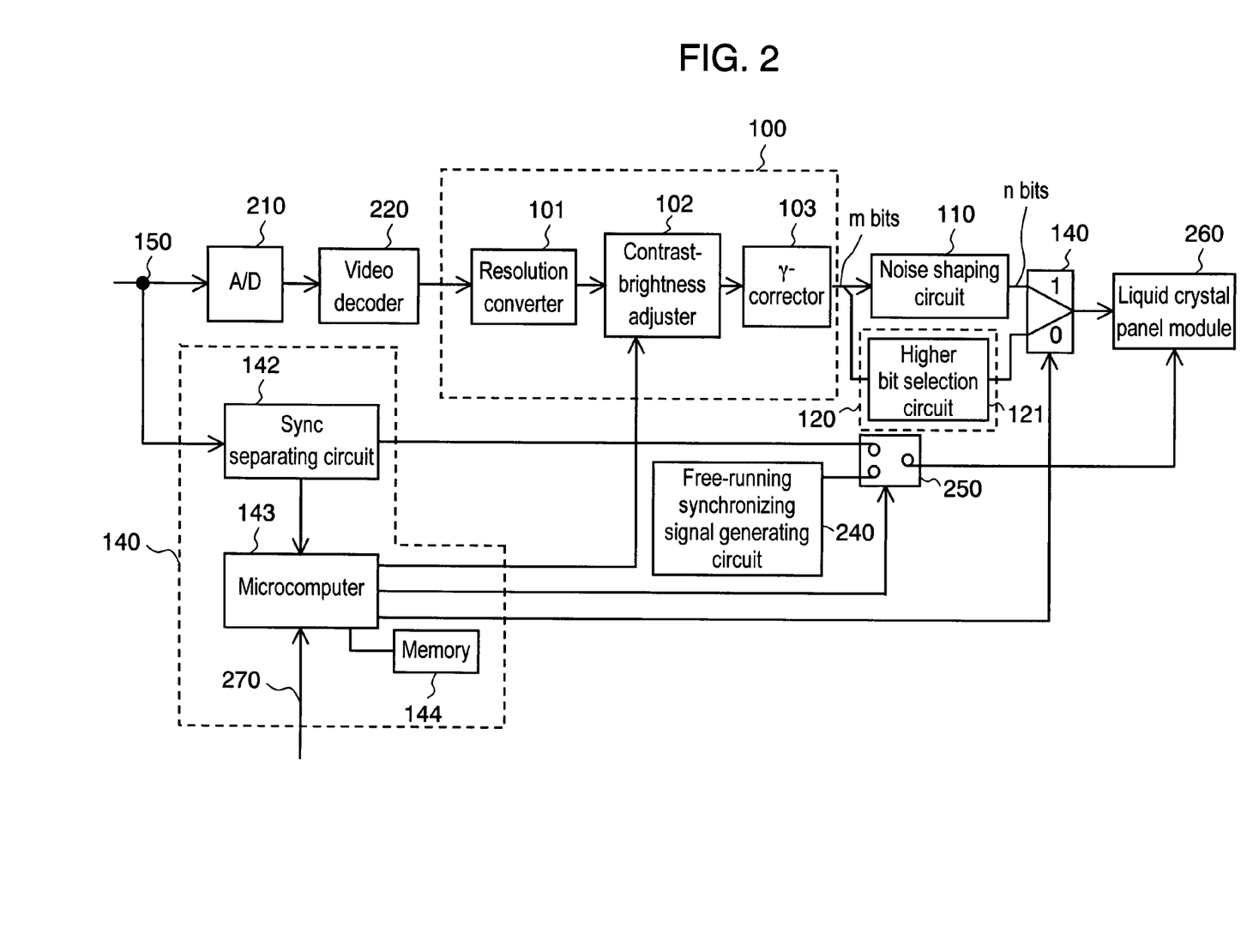
FIG. 2 is a block diagram showing a specific structure of bit reduction apparatus of the invention

FIG. 2 shows a more specific structure of the exemplary embodiment of the invention. In FIG. 2, same reference numerals as in FIG. 1 refer to same parts as in FIG. 1, and their detailed description is omitted.

A composite video signal supplied through the terminal 150 is converted into a digital signal by an analog/digital converter 210 (A/D in FIG. 2, A/D converter 210 hereinafter). A video decoder 220 converts the digital signal of the composite video signal produced from the A/D converter 210 into a digital signal of component video signal. In FIG. 2, the picture quality correction circuit 100 is composed of a resolution converter 101, a contrast-brightness adjuster 102, and a γ-corrector 103. The resolution converter 101 converts the resolution of output of the A/D converter 210. A specific processing example of the resolution converter 101 is a process of converting the number of pixels existing in one horizontal scanning period (number of horizontal pixels) or the number of scanning lines existing in one screen (number of vertical pixels). This process is necessary for matching with the composition of number of pixels required in a rear stage. The resolution converter 101 often executes filter processing in order to prevent deterioration of picture quality at the time of conversion of composition of number of pixels. In this manner, the output of the A/D converter 210 can be matched with the number of horizontal pixels and number of vertical pixels to be handled in the circuit of rear stage, display, etc. The contrast-brightness adjuster 102 converts the value of video data from the resolution converter 101, and adjusts the contrast, brightness, and saturation of the image displayed on the screen. The γ-corrector 103 executes γ-correction on the video data from the contrast-brightness adjuster 102, and corrects linearity of the luminance and saturation of the image displayed on the screen. By the resolution converter 101, contrast-brightness adjuster 102 and γ-corrector 103, the picture quality of the image displayed on the screen in a rear stage is corrected.

The composite video signal supplied through the terminal 150 is also supplied in the discriminating circuit 140. In FIG. 2, the discriminating circuit 140 is composed of a sync separation circuit 142, a microcomputer 143, and a memory 144.

The sync separation circuit 142 separates a synchronizing signal from the composite video signal supplied through the terminal 150, and supplies the separated synchronizing signal into the microcomputer 143 and second selector 250 (hereinafter called selector 250). In the microcomputer 143, the synchronizing signal separated in the sync separation circuit 142, and the setting information entered by the user through a setting input terminal 270 are supplied. The memory 144 is connected to the microcomputer 143. The microcomputer 143 generates a discrimination signal on the basis of the state of the input synchronizing signal, the setting information entered through the setting input terminal 270, and the data stored in the memory 144. The data stored in the memory 144 includes the setting information of the picture quality correction circuit 100, setting values of the user already entered through the setting input terminal, and information about judging algorithm in the microcomputer 143. The discriminating circuit 140 controls the contrast-brightness adjuster 102, selector 140, and selector 250.

A free-running synchronizing signal generating circuit 240 generates a free-running synchronizing signal. At one input terminal of the selector 250, a synchronizing signal generated in the free-running synchronizing signal generating circuit 240 is supplied, and at other input terminal, a synchronizing signal separated in the sync separation circuit 142 is supplied. The selector 250 is controlled by the microcomputer 143, and selects the synchronizing signal when the synchronizing signal is produced from the synchronizing signal separating circuit. On the other hand, the selector 250, being controlled by the microcomputer 143, selects the synchronizing signal from the free-running synchronizing signal generating circuit 240 when synchronizing signal is not produced from the synchronizing signal separating circuit.

FIG. 2 shows a liquid crystal panel module 260 as an example of display. The liquid crystal panel module 260 receives video data from the selector 140 and the synchronizing signal from the selector 250. The liquid crystal panel module 260 is synchronized in display by the synchronizing signal from the selector 250, and receives the video data from the selector 140, and displays the image.

In this constitution, same effects as in the exemplary embodiment shown in FIG. 1 are obtained.

In addition, in the exemplary embodiment of the invention shown in FIG. 2, the selector 140 is controlled on the basis of the user's setting situation, setting status of the picture quality correction circuit 100, information stored in the memory 144, synchronizing signal separation result, and others. That is, it is possible to control in pixel unit, control on the basis of properties of image, or control on the basis of setting status of signal processing. As a result, an adequate and high-quality bit reduction apparatus is realized.

Further, in the exemplary embodiment of the invention shown in FIG. 2, if video signal is not entered in the terminal 150 or video signal accompanied by synchronizing signal of poor quality is supplied, the synchronizing signal is supplied into the liquid crystal panel module 260. Therefore, the bit reduction apparatus capable of executing stably the scanning operation of the liquid crystal panel module 260 is realized.

Figure 3:
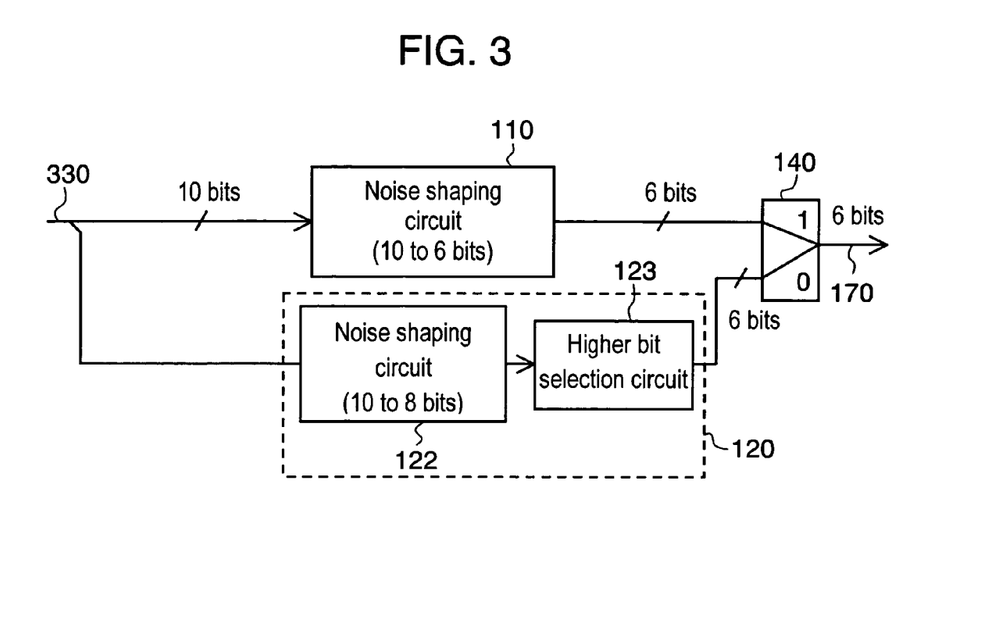
FIG. 3 is a block diagram showing other example of the portion for curtailing the number of bits in the invention.

Other example of the second bit reduction unit 120 in the bit reduction apparatus shown in FIG. 1 and FIG. 2 is explained together with FIG. 3.

FIG. 3 is a block diagram showing other example of the second bit reduction unit 120 in the bit reduction apparatus shown in FIG. 1 and FIG. 2. In FIG. 3, same reference numerals as in FIG. 1 or FIG. 2 refer to same parts as in FIG. 1 or FIG. 2. The output of the picture quality correction circuit 110 is supplied into the noise shaping circuit 110 as first bit reduction unit and the second bit reduction unit 120 by way of a terminal 330. The second bit reduction unit 120 is composed by cascade connection with a second noise shaping circuit 122 (hereinafter called noise shaping circuit 122) and a second higher bit selection circuit 123 (hereafter called higher bit selection circuit 123). A selector 140 receives the output from the noise shaping circuit 110 and the output from the higher bit selection circuit 123, selects either one, and sends to a terminal 170.

The video signal supplied in the terminal 330 is composed of ten bits, and a case of issuing six bits from the terminal 170 is supposed. That is, m is 10 and n is 6. The noise shaping circuit 110 processes ten-bit signal by noise shaping, and supplies the signal reduced to six bits to the selector 140. On the other hand, the noise shaping circuit 122 processes the input signal of ten bits by noise shaping, and supplies the signal reduced to eight bits to the higher bit selection circuit 123. The higher bit selection circuit 123 discards the two lower bits of the output signal from the noise shaping circuit 122, and supplies the six higher bits to the selector 170.

Since the noise shaping circuit 122 curtails the number of bits to eight bits, PWM takes place at a value corresponding to the least significant bit, that is, at a level of 1/256 of dynamic range. Two lower bits of the signal are deleted in the higher bit selection circuit 123. Although the output of the noise shaping circuit 122 is accompanied by PWM, if the two lower bits of the output signal vary between 11 and 00 and are accompanied by PWM, the sixth bit from the most significant bit (MSB) also varies between 1 and 0. Therefore, in such a case, the output of the higher bit selection circuit 123 is also accompanied by PWM at the value corresponding to this sixth bit, that is, at a level of $1/64$ of dynamic range. Unless PWM takes place due to appearance of 11 and 00 in the two lower bits of the output of the noise shaping circuit 122, the sixth bit does not fluctuate, and hence the output of the higher bit selection circuit 123 is not accompanied by PWM.

That is, in the constitution in FIG. 3, the second bit reduction unit 120 is accompanied by PWM at low frequency. By this operation, better picture quality than in FIG. 1 or FIG. 2 can be obtained.

Figure 4:
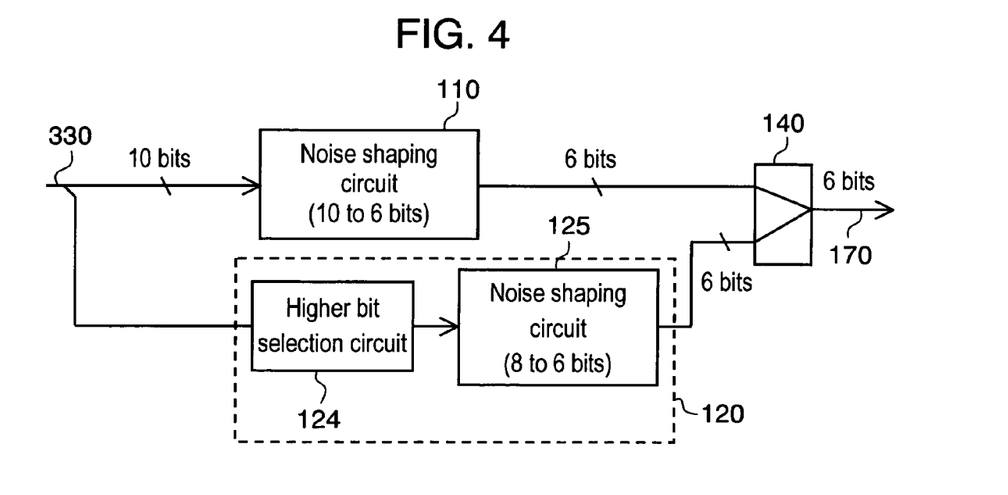
FIG. 4 is a block diagram showing a different example of the portion for curtailing the number of bits in the invention.

A different example of the second bit reduction unit 120 in the bit reduction apparatus shown in FIG. 1 and FIG. 2 is explained together with FIG. 4.

FIG. 4 is a block diagram showing a different example of the second bit reduction unit 120 in the bit reduction apparatus shown in FIG. 1 and FIG. 2. In FIG. 4, same reference numerals as in FIG. 1 or FIG. 2 refer to same parts as in FIG. 1 or FIG. 2. The output of the picture quality correction circuit 110 is supplied into the noise shaping circuit 110 as first bit reduction unit and the second bit reduction unit 120 by way of a terminal 330. The second bit reduction unit 120 is composed by cascade connection with a third higher bit selection circuit 124 (hereinafter called higher bit selection circuit 124) and a third noise shaping circuit 125 (hereinafter called noise shaping circuit 125). A selector 140 receives the output from the noise shaping circuit 110 and the output from the noise shaping circuit 125, selects either one, and sends to a terminal 170.

The video signal supplied in the terminal 330 is composed of ten bits, and a case of issuing six bits from the terminal 170 is supposed. That is, m is 10 and n is 6. The noise shaping circuit 110 processes ten-bit signal by noise shaping, and supplies the signal reduced to six bits to the selector 140. On the other hand, the higher bit selection circuit 124 discards the two lower bits of the ten-bit video signal supplied at the terminal 330, and supplies the eight higher bits to the noise shaping circuit 125. The noise shaping circuit 125 processes the input signal of eight bits to curtail to six bits, and supplies the curtailed signal to the selector 140.

The noise shaping circuit 110 executes noise shaping process by using up to the tenth bit, or the least significant bit (LSB), so that fine processing can be executed. In other words, the noise shaping circuit 110 operates by using up to the value corresponding to the least significant bit, that is, including a level of 1/1024 of dynamic range, generates PWM, thereby producing six higher bits of the result.

On the other hand, the noise shaping circuit 125 curtails the signal of eight higher bits to six bits. The noise shaping circuit 125 cannot use the ninth bit and tenth bit, and hence executes noise shaping operation by using up to the eighth bit. The noise shaping circuit 125 generates PWM by operation including the value corresponding to the eighth bit from the MSB, that is, a level of 1/256 of dynamic range. Therefore, the noise shaping circuit 110 is capable of executing more finely than the noise shaping circuit 125.

That is, in the constitution in FIG. 4, the first bit reduction unit 110 executes fine noise shaping, while the second bit reduction unit 120 executes coarser noise shaping than the first bit reduction unit 110. By this operation, a better picture quality than in FIG. 1, FIG. 2 or FIG. 3 can be obtained.

As described herein, the bit reduction apparatus of the invention changes over the bit reduction operation depending on at least the input signal state, the user's setting state, or the apparatus setting state. Therefore, the bit reduction apparatus of the invention maintains the gradation, prevents generation of beat noise, and solves the problems of the prior art.

INDUSTRIAL APPLICABILITY

The bit reduction apparatus of the invention can prevent generation of beat noise while maintaining the gradation. If the input signal is constant in luminance, the bit reduction apparatus of the invention prevents recognition of PWM component as beat noise or vertical line noise.

REFERENCE NUMERALS IN THE DRAWINGS

100 Picture quality correction circuit
101 Resolution converter
102 Contrast-brightness adjuster
103 y-corrector
110 First bit reduction unit (first noise shaping circuit)
111 Adder
112 Delay unit
120 Second bit reduction unit
121 First higher bit selection circuit
122 Second noise shaping circuit
123 Second higher bit selection circuit
124 Third higher bit selection circuit
125 Third noise shaping circuit
130 First selector
140 Discriminating circuit
141 Sync detecting circuit
142 Sync separating circuit
143 Microcomputer
144 Memory
150,160,170 Terminal
210 Analog/digital converter
220 Video decoder
240 Free-running synchronizing signal generating circuit
250 Second selector
260 Liquid crystal panel module
270 Setting input terminal

The invention claimed is:

1. A bit reduction apparatus comprising:
a picture quality correction circuit for correcting picture quality of input video signal and outputting a corrected picture;
a first bit reduction unit for producing a first reduced bit picture by reducing a number of bits of the corrected picture outputted by picture quality correction circuit, and outputting a first reduced bit picture;
a second bit reduction unit for producing a second reduced bit picture by reducing the number of bits of the corrected picture outputted by the picture quality correction circuit, and outputting a second reduced bit picture;
a discriminating circuit for generating a discrimination signal at least as one factor for judging the detection result of a synchronizing signal of the input video signal; and
a first selector controlled by the discrimination signal selecting between one of the first reduced bit picture output by the first bit reduction unit and the second reduced bit picture output by the second bit reduction unit,
wherein the first bit reduction unit includes a first noise shaping circuit for shaping noise of the corrected picture of the picture quality correction circuit and reducing the number of bits of the corrected picture, and
wherein the bit reduction apparatus outputs an output video signal that has fewer bits than the input video signal.

2. The bit reduction apparatus of claim 1, further comprising:
a free-running synchronizing signal generating circuit generating a free-running synchronizing signal;
a second selector controlled by the discriminating circuit for selecting either one of an output of a synchronizing signal detecting circuit and the free-running synchronizing signal; and
a display unit scanning by the synchronizing signal issued from the second selector for displaying an output of the first selector,
wherein the discriminating circuit includes:
a sync separating circuit;
a microcomputer;
a memory; and
a setting input terminal for entering user's setting information;
wherein the discriminating circuit issues the discrimination signal on a basis of at least one of an output of the sync separating circuit and a user's picture quality setting status; and
wherein the first selector is controlled by the discriminating circuit, and selects either one of an output of the first bit reduction unit and an output of the second bit reduction unit.

3. The bit reduction apparatus of claim 1, wherein the second bit reduction unit includes a first higher bit selection circuit for selecting and issuing only a specific number of higher bits.

4. The bit reduction apparatus of claim 1, wherein the second bit reduction unit comprises:
a second noise shaping circuit for shaping noise and curtailing a number of bits; and
a second higher bit selection circuit for receiving a output of the second noise shaping circuit, and selecting and issuing only a specific number of higher bits.

5. The bit reduction apparatus of claim 1, wherein the second bit reduction unit comprises:

a third higher bit selection circuit for selecting and issuing only a specific number of higher bits; and a third noise shaping circuit for receiving an output of the third higher bit selection circuit, shaping noise, and curtailing a number of bits.

6. The bit reduction apparatus of claim 2, wherein the second bit reduction unit includes a first higher bit selection circuit for selecting and issuing only a specific number of higher bits.

7. The bit reduction apparatus of claim 2, wherein the second bit reduction unit comprises:

a second noise shaping circuit for shaping noise and curtailing a number of bits; and a second higher bit selection circuit for receiving an output of the second noise shaping circuit, and selecting and issuing only a specific number of higher bits.

8. The bit reduction apparatus of claim 2, wherein the second bit reduction unit comprises:

a third higher bit selection circuit for selecting and issuing only a specific number of higher bits; and a third noise shaping circuit for receiving an output of the third higher bit selection circuit, shaping noise, and curtailing a number of bits.

* * * * *

UNITED STATES PATENT AND TRADEMARK OFFICE
CERTIFICATE OF CORRECTION

PATENT NO. : 7,496,139 B2
APPLICATION NO. : 10/503103
DATED : February 24, 2009
INVENTOR(S) : Takahisa Hatano It is certified that error appears in the above-identified patent and that said Letters Patent is hereby corrected as shown below:

At Column 8, line 8, "picture outputted by picture" should read --picture outputted by the picture--

At Column 8, line 15, "factor for judging the detection" should read --factor for judging a detection--

At Column 8, line 19, "selecting between" should read --for selecting between--

At Column 8, line 61, "anumber" should read --a number--

At Column 8, line 62, "receiving a output" should read --receiving an output--

Signed and Sealed this

Eleventh Day of August, 2009

David J. Kappos
*Director of the United States Patent and Trademark Office*